Jan. 6, 1959    R. H. W. KROEKEL    2,867,458
SHAFT SEAL FOR GAS TURBINES AND THE LIKE
Filed Feb. 23, 1956
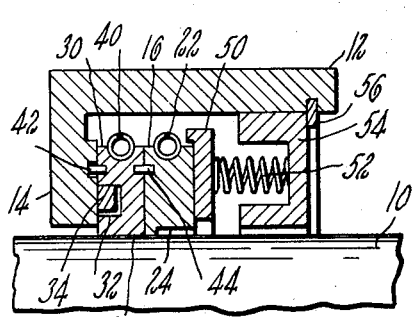
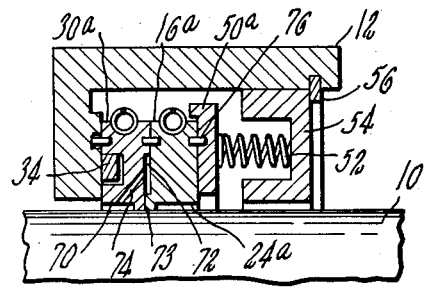
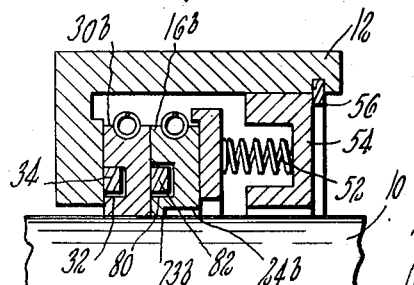
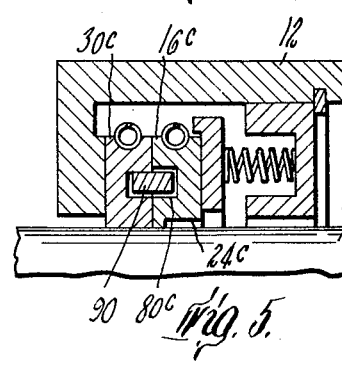
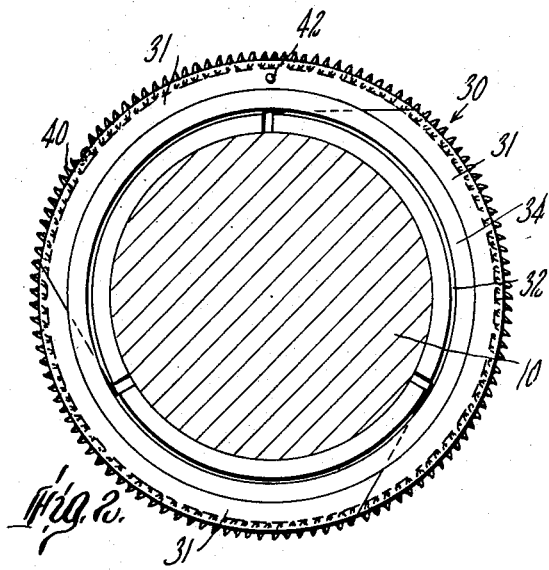
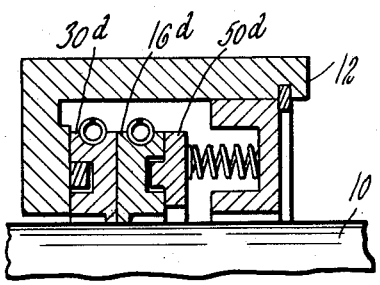
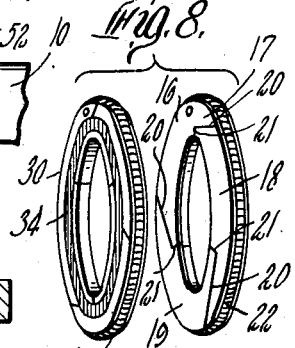
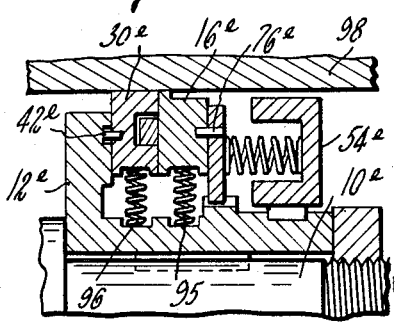

United States Patent Office 2,867,458
Patented Jan. 6, 1959

2,867,458

SHAFT SEAL FOR GAS TURBINES AND THE LIKE

Rolf H. W. Kroekel, West Greenwich, R. I., assignor to Sealol Corp., Warwick, R. I., a corporation of Rhode Island Application February 23, 1956, Serial No. 567,258

10 Claims. (Cl. 286—22)

This invention relates to a seal against detrimental fluid leakage axially of a relatively rotatable shaft and housing assembly.

It is a particular object of this invention to provide such a seal, for use, for example, in gas turbines, engines, compressors and the like, which is better able to cope with the leakage problem over a long period of time by reason of a novel design which reduces the applied forces to a point, still effective for sealing purposes, where wear is small and particularly to a point where the heat of friction is relatively low. Attainment of a low heat production rate in seals for gas turbines is especially desirable because the temperatures of power-producing operation are already so high that accumulation of further heat produced by friction of non-power producing sealing surfaces is not only undesirable, but often is the factor finally determinative of the acceptability or unacceptability of the seal, or a gang of seals, for a given installation, particularly in high speed installations.

It has been common to use a tangentially segmented split ring as one of the sealing members and to load the ring radially on the high pressure side so as to increase the sealing pressure as the pressure differential across the seal increases. In order to seal the radial portion of the tangential joint between the segments of the split ring, a second separate or secondary ring is placed in axial face-to-face contact with the first-mentioned or primary ring with the segments of the two rings being circumferentially offset. Sometimes, the secondary ring is split radially and at other times tangentially. In either case, the pressure of both rings against the shaft varies with the pressure differential and the friction between the running surfaces becomes so great at high speed and at high pressure differentials as to cause undue wear on the shaft and generate large amounts of heat.

According to this invention, I utilize a pair of segmented rings, at least one of which has its radial motion towards the surface to be sealed limited so that the maximum force exerted by it against the running surface, regardless of variation in the pressure differential across the seal, corresponds to that of a loose running fit only, such ring normally being the secondary ring used mainly to seal the gaps between the segments of the primary segmented ring by virtue of a pressure load exerted axially to hold the two rings in non-rotating face-to-face contact relative to each other. The primary ring under normal operation is pressure loaded so that its force against the sealing surface of the shaft does increase with increase in the pressure differential across the seal.

The secondary sealing ring may thus be assembled with either a normal type of primary segmented ring or a modified form of primary ring provided with a safety feature and which may take several forms as hereinafter described.

These and other purposes of the invention will become more apparent in connection with a description of various embodiments of the invention, illustrated in the accompanying drawing, wherein Fig. 1 is a cross-sectional view of a seal assembly embodying the invention; and Fig. 2 is a face view of one of the sealing rings constituting a component of the seal shown in Fig. 1; and Fig. 3 is a cross-sectional view of a modified form of seal; and Fig. 4 is a view of a still further modification particularly of the primary ring; and Fig. 5 is a cross-sectional view of another modification; and Fig. 6 is a cross-sectional view of another modification; and Fig. 7 is a cross-sectional view illustrative of the reversal of the type of seal shown in Fig. 1 and wherein the parts of the seal are fixed to the shaft instead of to a housing surrounding the shaft; and Fig. 8 is an exploded view, on a reduced scale, of the two sealing rings shown as component parts of the seal in Fig. 1; and Fig. 9 is a partial cross-sectional view of a modified form of the parts.

Referring to Fig. 1, a shaft 10 is surrounded by a housing 12, having an end flange 14 and providing a cavity for accommodation of the seal parts. These parts include a primary segmented ring 16, shown in detail in Fig. 8, comprising three segments 17, 18, 19, separated by tangentially extending contacting surfaces 20 which terminate in short inner radially extending non-contacting surfaces 21. The outer peripheral surfaces of the segments are grooved to receive a coil tension spring 22 which serves to maintain the segments in assembled relation and at their smallest inside diameter until mounted on shaft 10, the smallest inside diameter of the ring 16 being slightly less than the outside diameter of the shaft 10. Such a ring is well known in the art. Accordingly, the ring 16 of Fig. 8 may be yieldingly expanded as the seal is mounted on the shaft and, with no pressure differential across the seal, the ring 16 is held by the spring 22 in yielding engagement with the periphery of the shaft 10. As shown in Fig. 1, the internal surface of the ring 16 is preferably undercut at 24 so as to restrict the area of the running seal and provide a partially balanced seal, in accordance with known practices, under operating conditions.

The secondary ring 30, which is assembled in face-to-face relation is identical with the ring 16 except that the faces of its segments 31 on the low pressure side are provided with a composite counter-sunk annular groove or recess 32 for receiving a solid unsplit ring 34.

The width of groove 32 is greater than the radial width of ring 34 and the dimension of the ring 34 is precisely that dimension which will cause its engagement by the outer wall of the recess 32 at such a point in the radial contraction of the segments as to prevent their inner peripheries constituting the running surface 36 from having more than a firm running fit against the shaft 10. The solid ring 34 is constituted of a material chosen to have a certain coefficient of expansion with relation to that of the material of shaft 10, either greater, less or the same, so that the O. D. of the ring 34 and the O. D. of the shaft are maintained in predetermined relation over the whole range of operating temperatures. The outer wall of the recess 32 thus acts as an abutment surface engaging the outer periphery of the ring 34 as a stop. Ring 30, like ring 16, is provided with a peripheral groove and compression spring 40 for holding the parts against separation before mounting on the shaft and to permit radial expansion of the ring 30 while it is being mounted.

As shown in Fig. 1, key 42 may be provided between ring 30 and housing 14 and another loose fitting key 44 may be provided between the two rings 30 and 16, for the purpose of holding the parts, 14, 30 and 16 in non-rotatable relationship but permitting a limited amount of independent contraction and expansion between the two rings and between the rings and the housing. Other means for restraining rotation between the housing and the two rings can be used instead of keys. For example, each of the springs 40 and 22 may be anchored to the housing, so that they exert a frictional restraint upon rotation of the two rings relative to the housing.

The other parts of the seal shown in Fig. 1 are more or less conventional, including a ring 50 providing a seating surface for a series of circumferentially spaced axially extending coil springs 52, the other ends of which are seated against an internally extending wall 54 fixed to the housing 12. The wall part 54 is conveniently held against axial separation from the housing 12 by a snap ring 56 snapped into an internal groove extending around the inner periphery of the housing 12.

The springs 52 maintain a yielding load which holds the two rings 16 and 30 in face-to-face contact against the inner face of the flange 14 of housing 12 even without a pressure drop across the seal.

In Fig. 1, the high pressure side of the seal is to the right and the key 44 is placed to maintain the two rings with their radial gaps offset circumferentially as indicated by the positions of the parts in Fig. 8.

The undercutting of ring 16 at 24 permits the high pressure fluid to partially balance in a radially outward direction the total pressure of the fluid exerted on the outer periphery of the ring 16 and hence limit the total force applied to the running surface.

I have found that the secondary ring with its offset splits is entirely sufficient to seal the radial gaps 21 of the primary ring 16 and without adding to the area of the running surface areas which are under direct influence of the change in pressure differential, the solid ring 34 serving to limit the force applied by the ring 30 to the shaft 10 despite increasing pressure differential and despite contraction or expansion of the shaft or other parts as a consequence of variation in dimensions with temperature changes.

The seal shown in Fig. 3 is similar to that shown in Fig. 1 with the exception that the secondary ring 30a is also undercut along its inside periphery at 70 and is also relieved at 72 along its surface facing the primary ring 16a. The purpose of the undercut 70 is again to reduce the total area of the running surface and the purpose of the undercut 72 is to permit the ring 16a to be provided with a partially offset running surface 73 so that the undercut 24a of the ring 16a may be enlarged to reduce the effective area of 16a which will convert the pressure of the fluid into force applied through the running surface to the shaft. If desired, to prevent buildup of pressure in the undercut recess 72, it may be vented to the low presure side by one or more vents 74.

Fig. 3 also adds to the showing of Fig. 1 in providing a third key 76 between ring 16a and guard ring 50a.

In Fig. 3, the operation of solid ring 34 is identical with that described in the case of the structure of Fig. 1.

Fig. 4 shows a seal similar to that of Fig. 1 except for the fact that the primary ring 16b in Fig. 4 is also provided with an annular groove or recess 80 for receiving a solid unsplit ring 82. However, in this case, the O. D. of the recess 80 at commencement of operation will be somewhat greater than the O. D. of the ring 82. The purpose of the ring 82 is not to limit the radial contraction of ring 16b during normal operation or wear but only to provide a safety feature or radial abutment so that if and when the running surface 73b of ring 16b is worn away by wear, clearance between surface 73b and shaft will develop before the undercut surface 24b comes into contact with the shaft 10, thus providing warning through increased leakage before damage to the shaft by frictional heat.

The same type of safety device is incorporated in Fig. 5, except that in this case the two rings 34 and 82 shown in Fig. 4 have been combined into a single ring 90, the recess 32 of Fig. 4 having been placed on the other side of the secondary ring 30c so as to face the ring 16c. Here again the O. D. of the recess 80c is so related to the diameter of the undercut portion of 24c that as the ring 16c wears in use, its radial contraction will be stopped before the surface of the undercut portion 24c engages the shaft 10. On the other hand, the solid ring 90 prevents even initial radial contraction of the secondary ring 30c beyond an initial firm running fit.

In Fig. 6 the secondary ring 30d is substantially identical to that shown in Fig. 3. The primary ring 16d, however, has its annular recess on the opposite face of the ring from that shown in Figs. 4 and 5 and the solid ring 82 of Fig. 4 is made integral with the spring seating annulus 50d. Otherwise, the operation is identical with that of the structures of Figs. 4 and 5.

Fig. 7 is illustrative of a reverse mounting wherein the seal housing 12e is keyed to the shaft 10e and the wall 54e extends radially outwardly therefrom. The primary ring 16e and the secondary ring 30e with the interlocking keys 42e and 76e are retained and the only other necessary change is that instead of having annular coil springs 22 and 40, as in Fig. 1, there is provided a series of radially expanding springs circumferentially spaced around the housing 12e, one pair of which 95 and 96 is shown in Fig. 7 seated between the housing 12e and the rings 16e and 30e respectively. The running surfaces of these rings engage an axially extending surface 98 of a stationary member or other member which has rotation relative to the shaft 10.

In Fig. 9, a common solid ring like the ring 90 of Fig. 5 is provided but in this case, in order to strengthen its stability against radial motion, it is provided with a medial outwardly extending web 101 and a medial inwardly extending web 102, so that it has a cruciform cross section. Ring 16f bears against both webs, as does ring 30f, on either side of the central portion of the solid ring 100.

As will be seen from Fig. 9, the inner diameter of solid ring 100 is substantially greater than the outside diameter of the shaft 10 so that it will never come into contact with the shaft 10.

A further feature of the construction shown in Fig. 9 is the provision of an undercut recess 103 between ring 30f and the housing wall 14f. This recess 103 communicates with the high pressure side through a series of vents 104 through the outer flange of ring 30f. By properly dimensioning the radial width of the chamber or cavity 103, a partial balance may be secured to prevent axial binding between the rings 16f, 30f and 100 at high pressure differentials, which binding might prevent independent contraction of ring 16f, on which contraction the success of the seal depends with increasing pressure differentials.

As can be understood, the recess 103, shown in Fig. 9 as being formed partly by the wall of ring 30f and partly by the wall of the housing 14f, may be formed wholly in the housing or wholly in the ring and may be incorporated in any of the modifications of the invention.

It is understood that in some of the figures, the keys have been omitted but may be incorporated.

I claim:

1. A fluid seal assembly for gas turbines and the like comprising a pair of independently radially contractible split rings disposed on a common axis, each of said rings having an inner periphery forming a running sealing surface for a shaft, said rings having their splits circumferentially offset, both of said rings having abutment surfaces concentric with their running surfaces but the abutment surface of the primary of said rings being at a greater diameter than that of the secondary of said rings, a solid annulus disposed in the path of both said abutment surfaces for limiting contraction of said secondary ring to a firm running fit against said shaft and of said primary ring to a smaller diameter, both of said rings having their outer peripheral surfaces exposed to the high pressure to be sealed, and the primary ring being nearer to the high pressure side of the seal along said shaft than the secondary ring, said solid ring having radially extending webs against opposite surfaces of which said primary and secondary rings bear and means for holding said primary, secondary and solid rings in axially assembled relation with said splits circumferentially offset.

2. In a fluid seal assembly for gas turbines and the like the combination comprising a housing, a primary segmented radially contractible and expansible split ring having a composite peripheral sealing surface, said ring having a flat radially extending end face interrupted by axially extending apertures existing between the segments, a secondary segmented split ring for sealing said apertures, said rings being disposed on a common axis within said housing, said secondary ring having axially extending apertures between its segments circumferentially offset from those of said primary ring, said secondary ring having countersunk in a face thereof an annular channel, means for positively limiting the radial motion of said secondary ring comprising a solid annulus disposed in said channel, said annulus being free and independent of said housing to permit relative motion therebetween in a radial direction, and means for maintaining said rings in offset-aperture, independently radially movable but non-rotatable and radially sealing relation to each other.

3. In a fluid seal assembly for gas turbines and the like, said assembly having a housing, for mounting within said housing, a first segmented radially contractible and expansible split ring having a composite peripheral sealing surface, and a flat radially extending end face interrupted by axially extending apertures existing between the segments, a second segmented split ring for sealing said apertures, said second ring being in face-to-face contact with said first ring and having axially extending apertures between its segments circumferentially offset from those of said first ring, said second ring having cut in one face thereof an annular channel, means for positively limiting the radial motion of said second ring comprising a solid annulus disposed in said channel, said annulus being free and independent of said housing to permit relative motion therebetween in a radial direction, and means for maintaining said rings in offset-aperture, face-to-face, independently radially movable contact with each other.

4. In a fluid seal assembly for the shaft of a gas turbine and the like, said assembly having a housing for mounting within said housing, a first segmented radially contractible split ring having an inner composite periphery in running engagement with the surface of said shaft and a flat radially extending end face interrupted by axially extending apertures existing between the segments, a secondary segmented split ring for sealing said apertures, said second ring being in face-to-face contact with said first ring and having axially extending apertures between its segments circumferentially offset from those of said first ring, said secondary ring having cut in a face thereof an annular channel, means for positively limiting the contraction of said second ring comprising a solid annulus disposed in said channel, said annulus being free and independent of said housing to permit relative motion therebetween in a radial direction, and means for maintaining said rings in offset-aperture, face-to-face independently radially movable but non-rotatable contact with each other.

5. A seal assembly for gas turbines and the like having a housing and a shaft, comprising a pair of independently radially contractible split rings disposed in face-to-face contact with one another and arranged to be mounted within said housing, each of said rings having an inner periphery forming a running sealing surface for said shaft, said rings having their splits circumferentially offset, the secondary of said rings having abutment surfaces concentric with its running surface, a solid annulus in the path of said abutment surfaces for limiting contraction of said secondary ring to a firm running fit against said shaft, said annulus being free and independent of said housing to permit relative motion therebetween in a radial direction, and the other primary ring having its radial contraction less restricted, both of said rings having their outer peripheral surfaces exposed to the high pressure to be sealed and said primary ring being nearer to the high pressure side of said seal along said shaft than said secondary ring, whereby the force of said primary ring exerted against said shaft is responsive to variations in the pressure drop across said seal and the force exerted by said secondary ring against said shaft is independent of said variations after said secondary ring has reached the limit of its contraction by reason of engagement of said abutment surfaces with said solid annulus.

6. An assembly as claimed in claim 5 wherein one face of said secondary split ring has cut therein an annular channel whose walls define said abutment surfaces and wherein said annulus is countersunk in said channel.

7. A seal assembly for gas turbines and the like comprising a pair of independently radially contractible split rings disposed in face-to-face contact with one another, each of said rings having an inner periphery forming a running sealing surface for a shaft, said rings having their splits circumferentially offset and having face-to-face channels formed in their facing surfaces, the channel in the primary of said rings having a greater outside diameter than the facing channel in the secondary of said rings, a solid annulus extending into both of said channels across the interface between said rings for limiting the radial contraction of both of said rings, both of said rings having their outer peripheral surfaces exposed to the high pressure to be sealed and said primary ring being nearer to the high pressure side of said seal along said shaft than said secondary ring, whereby the force of said primary ring exerted against said shaft is responsive to variations in the pressure drop across said seal and the force exerted by said secondary ring against said shaft is independent of said variations after said secondary ring has reached the limit of its contraction by reason of engagement of said abutment surfaces with said solid annulus.

8. A seal assembly for gas turbines and the like comprising a pair of independently radially contractible side-by-side split rings having inner peripheries forming running sealing surfaces for a shaft and having their splits circumferentially offset, said rings having flanges extending axially towards one another in opposed directions to form a face-to-face sealing contact therebetween and to define an intervening annular cavity sealed against high pressure and surrounding a portion of the running sealing surface of the primary of said rings, the secondary of said rings having abutment surfaces concentric with its running surface, a solid annulus in the path of said abutment surfaces for limiting contraction of said secondary ring to a firm running fit against said shaft and the other primary ring having its radial contraction less restricted, both of said rings having their outer peripheral surfaces exposed to the high pressure to be sealed and said primary ring being nearer to the high pressure side of said seal along said shaft than said secondary ring, whereby the force of said primary ring exerted against said shaft is responsive to variations in the pressure drop across said seal and the force exerted by said secondary ring against said shaft is independent of said variations after said secondary ring has reached the limit of its contraction by reason of engagement of said abutment surfaces with said solid annulus.

9. A seal assembly for gas turbines and the like having a shaft, comprising a housing, a pair of independently radially contractible split rings disposed in face-to-face contact with one another within said housing, each of said rings having an inner periphery forming a running sealing surface for said shaft, said rings having their splits circumferentially offset and having abutment surfaces concentric with their running surfaces, a solid annulus in the path of each of said abutment surfaces for positively limiting contraction of said rings, said annulus being free and independent of said housing to permit relative motion therebetween in a radial direction, the abutment surface of the secondary ring engaging the solid annulus during contraction of the secondary ring to restrict its movement to a firm running fit against said shaft and the surface of the other abutment primary ring engaging the solid annulus at a more contracted position, both of said rings having their outer peripheral surfaces exposed to the high pressure to be sealed and said primary ring being nearer to the high pressure side of said seal along said shaft than said secondary ring, whereby the force of said primary ring exerted against said shaft on initial installation is responsive to variations in the pressure drop across said seal and the force exerted by said secondary ring against said shaft is independent of said variations after said secondary ring has reached the limit of its contraction by reason of engagement of its abutment surface with said solid annulus.

10. In a fluid seal assembly for gas turbines and the like having a housing and a shaft, at least one segmented radially contractible and expansible split ring having a composite peripheral sealing surface, said ring being adapted to be mounted within said housing with said sealing surface in running sealing engagement with said shaft, said ring having a flat radially extending end face interrupted by axially extending apertures existing between the segments, said face having countersunk therein an annular channel, and means for positively limiting the radial motion of said ring comprising a solid annulus disposed in said channel, said annulus being free and independent of said housing to permit relative motion therebetween in a radial direction.

References Cited in the file of this patent

UNITED STATES PATENTS

| | | |
|---|---|---|
| 774,490 | Paine | Nov. 8, 1904 |
| 883,799 | Harbinger | Apr. 7, 1908 |
| 980,231 | Farquhar | Jan. 3, 1911 |
| 1,331,522 | Parsons et al. | Feb. 24, 1920 |